United States Patent [19]

Gottlieb

[11] 4,365,136
[45] Dec. 21, 1982

[54] ZONE REFINEMENT OF INERTIA WELDED TUBULARS TO IMPART IMPROVED CORROSION RESISTANCE

[75] Inventor: Theodore Gottlieb, Glendale, Calif.

[73] Assignee: Hydril Company, Los Angeles, Calif.

[21] Appl. No.: 237,296

[22] Filed: Feb. 23, 1981

[51] Int. Cl.³ .......................................... B23K 27/00
[52] U.S. Cl. ........................ 219/121 LE; 148/127; 219/121 LD; 219/121 LF; 219/121 LQ; 219/121 LS; 219/121 LY; 228/214
[58] Field of Search ..... 219/121 L, 121 LM, 121 LE, 219/121 LC, 121 LF, 121 LD, 121 LQ, 121 LP, 121 LS, 121 LT, 121 LY, 121 EB, 121 EC, 121 EM, 121 ED, 121 EF, 121 EG; 228/199, 214, 231; 148/127-139

[56] References Cited

U.S. PATENT DOCUMENTS

| | | | |
|---|---|---|---|
| 3,250,842 | 5/1966 | Hikido | 13/31 |
| 3,769,117 | 10/1973 | Bowen et al. | 156/69 |
| 4,000,392 | 12/1976 | Banas et al. | 219/121 LM |
| 4,017,708 | 4/1977 | Engel et al. | 219/121 LM |
| 4,063,063 | 12/1977 | Funck et al. | 219/121 LM |
| 4,080,525 | 3/1978 | Gobetz | 219/121 L |
| 4,122,240 | 10/1978 | Banas et al. | 219/121 L X |
| 4,129,771 | 12/1978 | Pinettes et al. | 219/121 EM X |
| 4,229,235 | 10/1980 | Mutsuda et al. | 148/127 |
| 4,239,556 | 12/1980 | Cline et al. | 148/39 X |
| 4,247,037 | 1/1981 | Tamai et al. | 148/127 |

FOREIGN PATENT DOCUMENTS

| | | | |
|---|---|---|---|
| 838816 | 4/1970 | Canada. | |
| 51-27840 | 3/1976 | Japan | 219/121 ED |
| 53-37125 | 4/1978 | Japan | 148/127 |
| 55-117583 | 9/1980 | Japan | 219/121 LE |
| 55-126368 | 9/1980 | Japan | 228/199 |

Primary Examiner—C. L. Albritton
Attorney, Agent, or Firm—William W. Haefliger

[57] ABSTRACT

Corrosion resistance of tubular metal products is enhanced, and particularly to welds formed between metal tubes or pipes and threaded ends.

20 Claims, 4 Drawing Figures

ZONE REFINEMENT OF INERTIA WELDED TUBULARS TO IMPART IMPROVED CORROSION RESISTANCE

BACKGROUND OF THE INVENTION

This invention relates generally to improving the corrosion resistance of metallic tubular products, and more particularly concerns imparting corrosion resistance to welds formed between metal tubes or pipes and threaded ends.

In the past, it was known to weld threaded ends to metallic drill pipe employed during drilling of an oil or gas well. Since the drill pipe did not remain in the well for relatively long time periods (i.e. it is removed after drilling) the problem of corrosion was not substantial; however, metallic production tubing remains in the well for relatively long periods, so that it was not deemed practical to weld threaded ends to metal tubing due to corrosion of the welds in the oil well. Accordingly, the advantages of welding threaded ends onto production tubing were not realizable. Such advantages include the relative ease of alleviating a de-formed threaded end by cutting it off the tubing and replacing it with a new or undamaged threaded end, as by weld-on; and the ability to carry out such replacement in the field—i.e. near an oil well, as opposed to having to order a new tubing length with integral threaded pin and box ends from a supplier. Therefore, a substantial need exists for a practical solution to the weld surface corrosion problem, as in the case of well production tubing. Such tubing and threaded ends typically consist of high strength steel.

SUMMARY OF THE INVENTION

It is a major object of the invention to provide method and apparatus to overcome the above described problems, and to meet the described need.

In its method aspect the invention fundamentally involve the steps:

(a) providing a steel tube and pre-fabricated threads, as on a threaded tubular end, and welding the latter to the tube to form a weld, (b) directing a laser beam at the surface of the weld to cause the beam to progressively and locally vaporize a thin film of the weld metal, and allowing the metal vapor to condense back onto the weld, thereby to form a corrosion resistant surface.

In this regard, inertia welding, forge welding and flash butt welding of pipe produces transverse grain flow in the weld region. The rate of corrosive attack of "end grain" caused by transverse grain flow is much more severe than on the unwelded portion of the pipe. This condition (sometimes called ring worm corrosion), is eliminated by fusing the surface layer to a given depth in the weld zone, creating a new morphology with improved corrosion characteristics. Such "zone refinement" melts the surface and thereby changes the morphology of impurities (which are film like in the grain), into either spheroids, floats them out of the metal to be removed as surface scum, or removes them by vaporization. Heating is typically accomplished in an inert atmosphere, such as argon or helium. Other method of local and progressive heat generation can be employed.

Added objects and techniques include the steps of relatively moving the beam and tube to extend the corrosion resistant surface over a substantial portion of the weld, and also onto the metal end portions adjacent the weld; effecting such relative movement as by rotating the tubing relative to the beam, and also relatively axially advancing the beam, whereby the entire annular surface of an annular weld is treated; the employment of multiple laser beams to simultaneously treat both outwardly and inwardly exposed weld surfaces; and the provision of apparatus to carry out the described steps.

These and other objects and advantages of the invention, as well as the details of an illustrative embodiment, will be more fully understood from the following description and drawings, in which:

DRAWING DESCRIPTION

DETAILED DESCRIPTION

Figure 1:
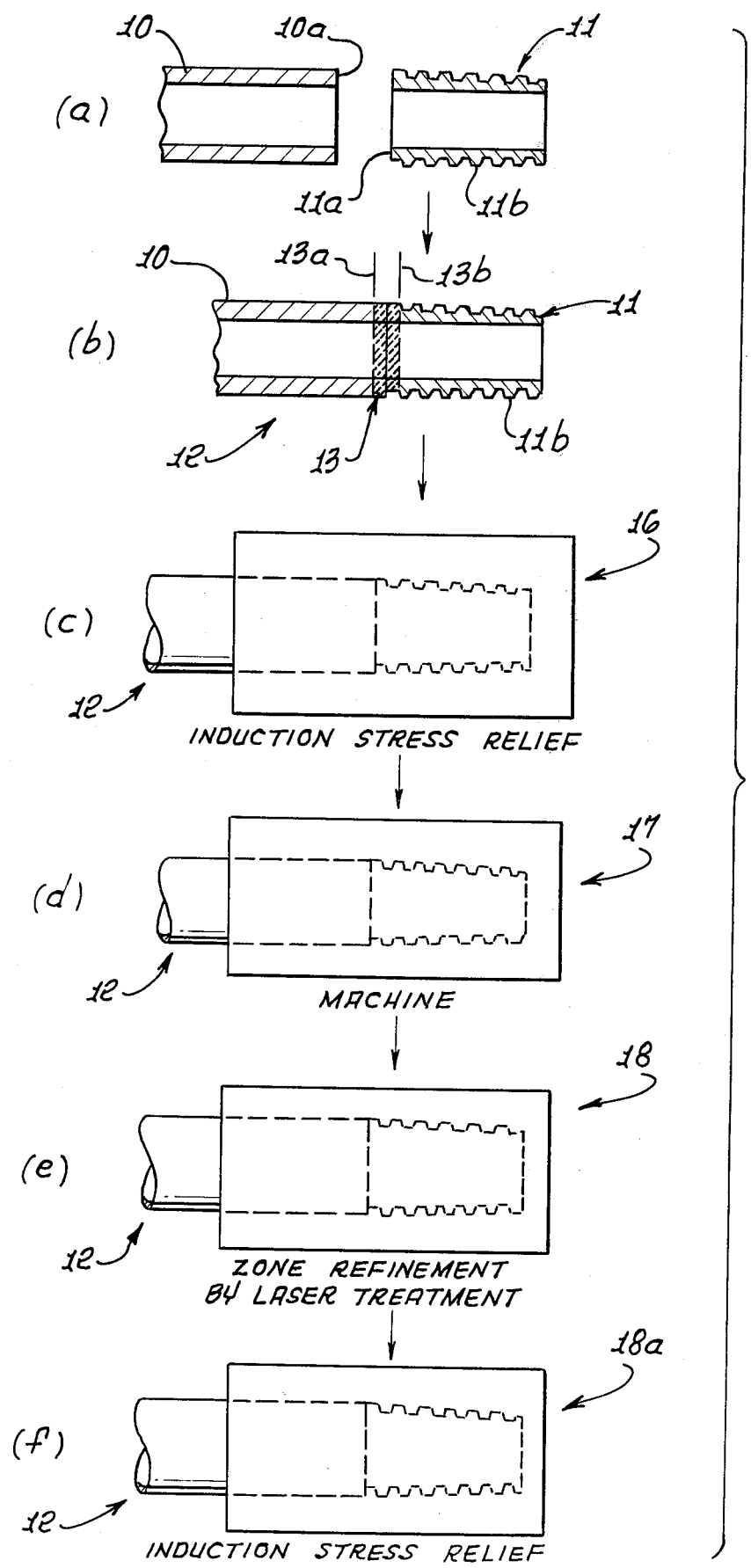
FIG. 1 is a diagram showing steps in the processing of a tubular steel produce comprising a tube to which a threaded end is connected.

In FIG. 1a, a steel tube 10 and a threaded end, as for example a pin end 11 (or a box end) are shown axially spaced apart. The end 11 has approximately the same, or nearly the same, metallurgical properties as the pipe 10, adapting the two to be welded at their end interfaces 10a and 11a. The thread appears at 11b. Pipe 10 may be provided by cutting off an existing threaded end, so as to enable welding thereto of a new end 11.

Figure 3:
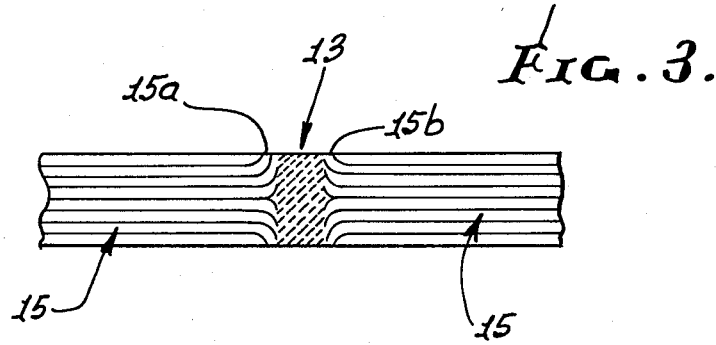
FIG. 3 is a diagrammatic view showing grain flow in an inertia weld, forge weld or flash butt weld at the end connection.

FIG. 1b shows the welded together combination of 10 and 11 (i.e. a threaded tube end) indicated by the numeral 12. The annular weld zone appears at 13, between planes 13a and 13b. Various usable welding techniques include inertia welding, friction welding, forge welding and flash butt welding. Typically, the metal is forged at the weld between planes 13a and 13b, which causes transverse grain flow. FIG. 3 shows the latter condition, with axial grain lines 15 turned radially outwardly at 15a and 15b adjacent the weld region 13. "End grain" is thereby produced, and is characterized by grain ends that terminate at the weld surface. When production tubing in this condition remains in corrosive well fluid in an oil well for extended time periods, corrosive attack of the "end grain" occurs, i.e. corrosion at this location is much more severe than at unwelded portions of the tubing, and the result is known as "ring worm corrosion".

In accordance with the invention, the weld zone is subjected at 18 to "zone refinement", which serves to locally melt the surface weld metal, changing the morphology of impurities (which are film-like in the grain), into either spheroids, or surface "scum" floated out of the liquid metal, or eliminates them by vaporization. Prior to such zone refinement, the threaded tube end 12 is typically subjected to induction stress relieving steps at 16 (at temperature between 750° F. and 1,250° F.), and to a machining step at 17, after cooling. The machining step removes flash at the weld bore and exterior surface. Stress relieving typically is also required at 18a after zone refining, in the area affected by heating above about 1,300° F.

Figure 2:
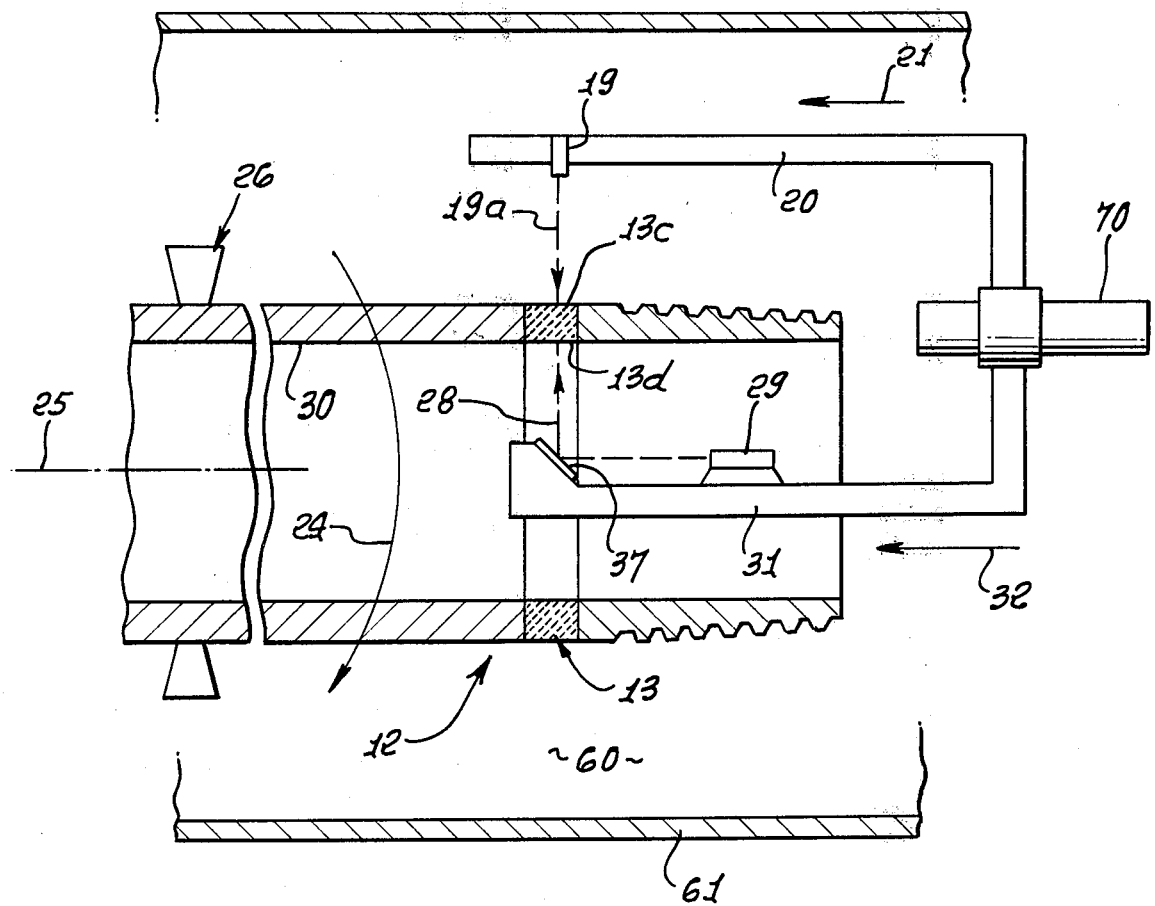
FIG. 2 is an enlarged section showing details of the process involving laser treatment of the end connection.
Figure 4:
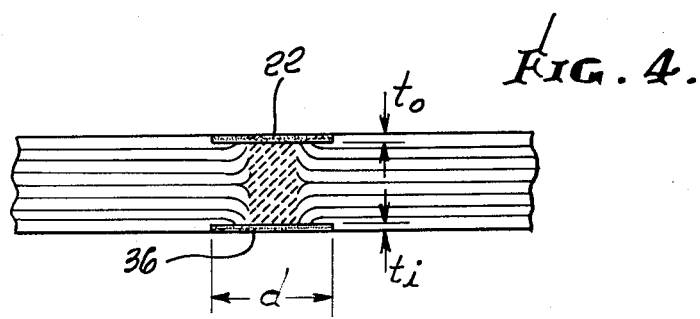
FIG. 4 is a diagrammatic view like FIG. 3, showing resultant zone refinement by fusion at inner and outer locations.

Extending the description to FIG. 2, a process of zone refinement, employing a laser or lasers, is shown. As there illustrated, a laser is provided at 19 for directing a beam 19a at the external surface 13c of the weld. In this regard, the laser may be supported as by a carriage 20 which is moved axially in the direction of arrow 21, achieving relative movement of the beam and tube and causing the beam to progressively and locally vaporize a thin film of metal over the axial length of the weld and adjacent heat affected zones. Simultaneously, the tubing is relatively rotated, as indicated by arrow 24, about its axis 25. A tool engaging the tubing to rotate same is indicated at 26. Accordingly, the entire outer surface of the weld is progressively treated by the laser beam so as to locally vaporize the metal, the metal subsequently condensing back onto the weld thereby to form a corrosion resistant outer surface layer 22 of thickness "$t_o$", as seen in FIG. 4.

In similar manner, a second laser beam 28 is produced as by a second laser 29, that beam directed at the interior surface 13b of the weld, in general alignment with the tube bore 30. Laser 29 may also be supported by a carriage 31 which is moved axially in the direction of arrow 32, achieving relative movement between beam 28 and the tube to cause the beam to progressively and locally vaporize a thin film of weld metal over the axial length of weld surface 13d. This also takes place as the tubing is relatively rotated; accordingly, the entire inner surface of the weld is progressively treated by the beam 28 to form a corrosion resistant inner surface layer 36 of thickness "$t_i$", as seen in FIG. 4. Both carriages 20 and 31 may be part of a single unit, to be advanced and retracted in unison. Also, a mirror 37 may be mounted on carriage 31, as shown, to redirect the laser beam 28 from axial to radial travel, if desired. Thus, beams 19a and 28 may be kept generally in alignment during the processing. Note further that the beams are moved axially an axial distance "d" to produce corrosion resistant surfaces 22 and 36 which overlap and extend onto the tube and threaded end surfaces at axially opposite sides of the weld to treat the grain ends at those surfaces. A carriage guide appears at 70.

An inert gas environment is typically maintained in the interior 60 of a chamber 61 wherein the above described zone refinement takes place. Such inert gas may consist of argon and/or helium.

Finally, while use of a laser or lasers has been described, other means may be employed to effect the progressive and local melting and/or vaporization of the thin film of metal, followed by condensation and/or solidification, thereby to form the corrosive resistant surface, as in the manner described.

I claim:

1. In the method of fabricating an oil or gas well metallic tubular product, the steps that include,
   (a) providing a steel tube and a pre-fabricated thread end and welding said thread end to the tube to form a weld,
   (b) directing a laser beam at the surface of said weld to cause the beam to progressively and locally vaporize a thin film of the weld metal, and allowing the metal vapor to condense back onto the weld, thereby to form a corrosion resistant surface.

2. The method of claim 1 including providing an inert gas environment wherein said local vaporization takes place.

3. The method of claim 2 wherein said inert gas is selected from the group that includes argon and helium.

4. The method of claim 1 including the step of relatively moving the beam and tube to extend said corrosion resistant surface over a substantial portion of the weld.

5. The method of claim 4 wherein said relative movement includes rotating the tube relative to the beam.

6. The method of claim 5 wherein said weld extends annularly, and said relative movement of the beam and tube includes relatively axially advancing the beam as the tube is relatively rotated, so that the beam progressively impinges on substantially all of the weld annular surface, and adjoining heat affected zones.

7. The method of claim 1 wherein the weld is annular and has an outer surface at the outwardly exposed outer side of said tubular product and an inner surface at the inwardly exposed inner side of the tube, said (b) step including;
   (i) directing a first laser beam at said outer surface of the weld to produce a corrosion resistant outer surface, and
   (ii) directing a second laser beam at said inner surface of the weld to produce a corrosion resistant inner surface.

8. The method of claim 7 wherein said inner and outer weld surfaces are annular, and including the step of relatively moving the beams and tube to extend said corrosion resistant surfaces over substantial portion of the weld inner and outer exposed surfaces.

9. The method of claim 8 wherein said relative movement includes rotating the tube relative to said beams.

10. The method of claim 9 wherein said relative movement of the beams and tube includes advancing the beams relatively axially of the tube as the tube is relatively rotated, so that the beams impinge on substantially all of the weld annular surface.

11. The method of claim 10 wherein said advancement is carried out to cause the beams to treat metallic surfaces adjacent the weld, at opposite ends thereof.

12. The method of claim 10 wherein said beams are advanced in unison.

13. The method of claim 10 wherein the beams are directed into substantial alignment as they impinge on the weld.

14. The method of claim 1 including the preliminary steps of stress relieving the tube at the region thereof which encompasses the weld.

15. The method of claim 14 including the step of machining the tube at the region thereof proximate the weld to remove weld flash.

16. In the method of fabricating an oil or gas well metallic tubular product, the steps that include,
   (a) providing a steel tube and a pre-fabricated thread end and welding said thread end to the tube to define a weld,
   (b) effecting progressive and local vaporization of a thin film of the weld metal, and allowing the metal vapor to condense back onto the weld, thereby to form a corrosion resistant surface.

17. In apparatus for the fabrication of our oil or gas well metallic tubular product, the combination comprising
   (a) means to support a steel tube to which a threaded end has been welded, and
   (b) means for directing a laser beam at the surface of said weld to cause the beam to progressively and locally vaporize a thin film of the weld metal, and allowing the metal vapor to condense back onto the weld, thereby to form a corrosion resistant surface.

18. The combination of claim 17 including a chamber defining a zone containing said weld during said metal surface vaporization, and an inert gas in said zone.

19. The combination of claim 17 wherein said (b) means includes a laser and a carriage therefor which is movable relative to said tubing.

20. The combination of claim 17 wherein said (b) means includes two lasers and carriage structure therefor, the lasers directing beams at inner and outer surfaces of said weld which is annular.

* * * * *